United States Patent
Hardt

[11] 3,918,939
[45] Nov. 11, 1975

[54] ELECTROSTATIC PRECIPITATOR COMPOSED OF SYNTHETIC RESIN MATERIAL

[75] Inventor: Lothar Hardt, Eschborn, Germany
[73] Assignee: Metallgesellschaft Aktiengesellschaft, Frankfurt am Main, Germany
[22] Filed: Sept. 3, 1974
[21] Appl. No.: 502,777

[30] Foreign Application Priority Data
Aug. 31, 1973 Germany ............... 2343900

[52] U.S. Cl. ............ 55/155; 55/112; 55/117; 55/121; 55/139; 55/151
[51] Int. Cl.² .................................. B03C 3/45
[58] Field of Search ......... 55/155, 154, 156, 139, 55/150, 151, 101, 112, 117, 118, 119, 121, DIG. 38

[56] References Cited
UNITED STATES PATENTS

| | | | |
|---|---|---|---|
| 1,650,097 | 11/1927 | Schmidt | 55/155 X |
| 1,650,105 | 11/1927 | Anderson | 55/155 X |
| 2,958,393 | 11/1960 | Lueder | 317/242 X |
| 3,541,390 | 11/1970 | Jahnke | 317/262 X |
| 3,750,373 | 8/1973 | Olson | 55 DIG. 38 |
| 3,765,154 | 10/1973 | Hardt et al. | 161/164 X |
| 3,793,802 | 2/1974 | Hardt | 55/156 X |
| 3,798,879 | 3/1974 | Schmidt-Burbach et al. | 55/527 X |

FOREIGN PATENTS OR APPLICATIONS

| | | | |
|---|---|---|---|
| 1,063,677 | 12/1953 | France | 55/155 |
| 186,047 | 1/1923 | United Kingdom | 55/155 |
| 828,282 | 2/1960 | United Kingdom | 55/155 |
| 895,024 | 4/1962 | United Kingdom | 55/155 |

Primary Examiner—Dennis E. Talbert, Jr.
Attorney, Agent, or Firm—Karl F. Ross; Herbert Dubno

[57] ABSTRACT

An electrostatic precipitator having a housing and collector plates composed of synthetic resin material in the form of an unsaturated polyester resin or an unsaturated vinyl ester resin with fire retardant additives and containing graphite in an average particle size up to 50 microns and a carbon content of 95 to 99 percent admixed with the resin of the housing walls and the collector plates such that the surface resistance of the collecting electrodes is equal to or less than $10^4$ ohms ($\leq 10^4 \Omega$) and the surface resistance of the housing is equal to or less than $10^6$ ohms ($\leq 10^6 \Omega$).

3 Claims, 1 Drawing Figure

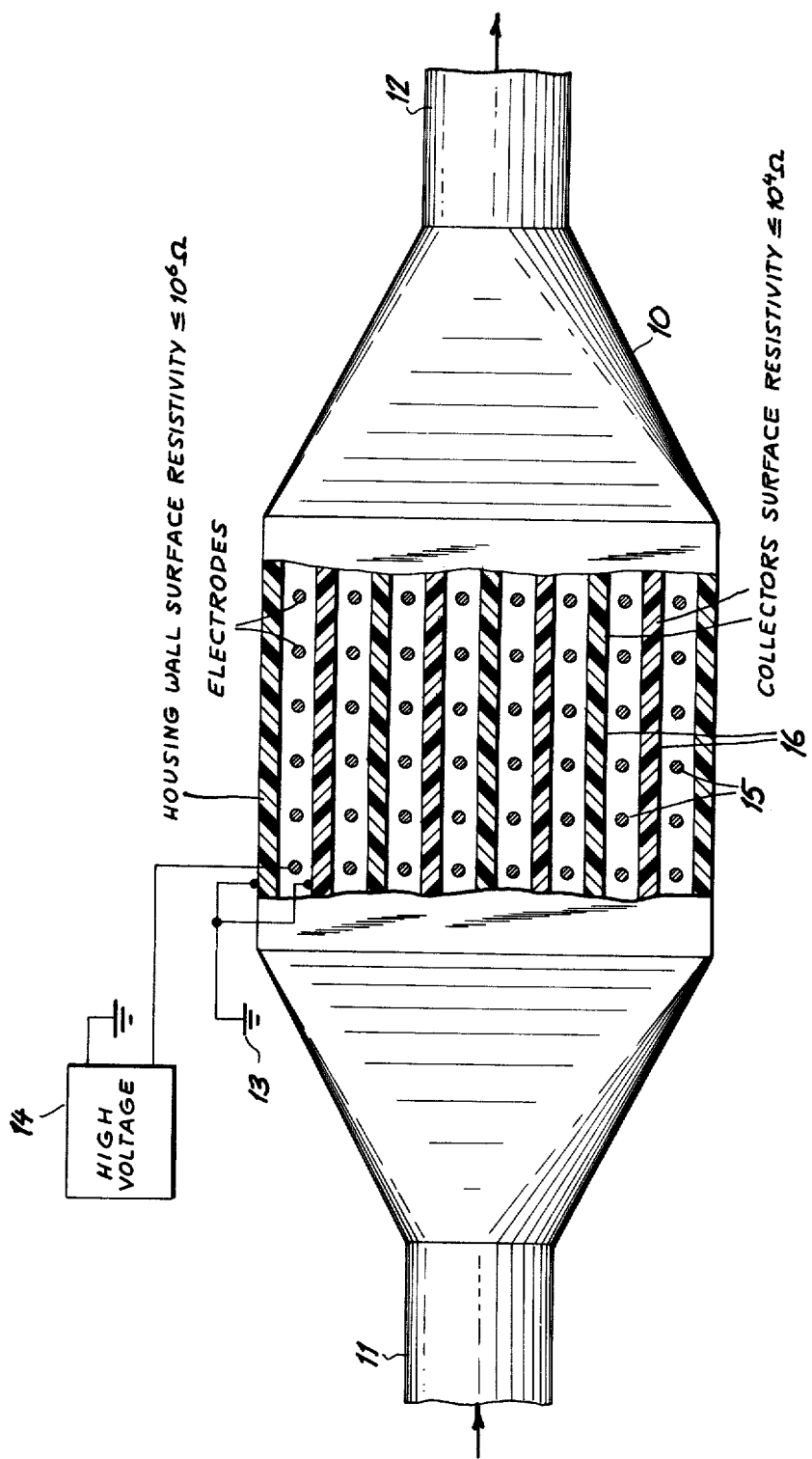

ELECTROSTATIC PRECIPITATOR COMPOSED OF SYNTHETIC RESIN MATERIAL

FIELD OF THE INVENTION

The present invention relates to improvements in electrostatic precipitators and, more particularly, to a wet or dry electrostatic precipitator composed at least in part of synthetic resin materials.

BACKGROUND OF THE INVENTION

In general, an electrostatic precipitator comprises a housing formed internally with a plurality of passages for a particle-laden gas stream. The passages may be defined by tubes, honeycombs or plates and spaced apart within these passages or ahead of these passages are corona discharge electrodes which impart an electric charge to the dust particles. The dust particles are electrostatically attracted to the collecting-electrodes whose surfaces are of the opposite potential and accummulate on the collector electrodes. The collected particles may be removed by jolting, wrapping, scrapping, washing or other means.

Electrostatic precipitators which are composed at least in part of synthetic resin (plastic) materials are also known and generally comprise tubes, honeycombs or plates made of glass-fiber-reinforced synthetic resin.

Such prior art systems have various problems which can be traced to the nature of the material from which they are composed and are not always effective in aggressive (corrision - producing) gases or for use in both dry or wet electrostatic precipitating conditions.

For example, it is known to make an electrostatic precipitator from a synthetic resin material such as polyvinyl chloride or composites having thermoplastic inner layers. These materials generally have a high electric surface resistance exceeding $10^{12} \Omega$ and are only used in tube, honeycomb, or plate electrostatic precipitators for operation under wet conditions. The particle-collecting surfaces are maintained at a potential other than that at the corona discharge electrodes by providing them with a thin film of liquid of substantially higher conductivity than the surfaces of the plates. The collecting surfaces are thus covered by a liquid film which discharge the electrical charge accummulated from the collected particles. The liquid, generally acids, are of conductivity sufficient to carry away the charge-dissipation current as required.

The problems in such systems is primarily to provide the collecting surfaces with a uniform coherent liquid film. Because wetting the surfaces of synthetic resin materials is difficult, at best, small streams or rivelets are formed, mainly at the lower ends of the collecting electrodes and dry areas or islands are left between the streams.

Sparkover occurs mainly at the boundary between wet and dry areas and the local temperature rise due to sparkover results in the destruction of the plastic material.

Burning is not only a result of sparkover, since tracking currents or glow discharge currents flow on the collecting electrodes long before a sparkover occurs. These currents cannot be detected or influenced by conventional automatic electrical controls which are generally responsive only to sparkover.

Attempts to solve the problem by roughening the collecting surface have proved unsatisfactory. Surface roughening increases the adhesion of the liquid to the synthetic resin surface, but does not prevent dripping at the lower edge of the electrode, changes in the thickness of the liquid layer and the like.

Another approach has been to graphitize the surface of the collecting electrodes but such surface coatings are frequently washed off with time so that the electrode must be recoated or is again disadvantaged by sparkover or the like.

Other coating techniques have been proposed. These techniques include the painting of the surface of the synthetic resin material with conducting varnishes which contain metallic particles corroded, oxidized or dissolve by the substances treated. Furthermore, any corrosion or oxidation tends to decrease conductivity and hence defeat the very purpose for which such metal particles were originally provided. The addition of noble metals to surface coatings has been impractical because of the high cost of such metals, especially since noble metal coatings also disintegrate and give rise to a migration of the metal particles.

Plastic materials reinforced with glass fibers have a high mechanical strength and temperature resistance, but have not been successful heretofore because a roughening of the surface gives rise to hairline cracks, especially where the synthetic resin material is a thermosetting resin such as a polyester, these cracks penetrating into the body and leading to destruction of the collector plate.

OBJECTS OF THE INVENTION

It is an object of the invention to improve the collection of particles from corrisive and aggressive gases in electrostatic precipitators composed of synthetic resin materials and operated under dry or wet conditions.

It is a further object of the invention to provide a plastic material particularly suitable for the requirements of electrostatic precipitators and capable of being used in a dry electrostatic precipitator without coating, without local over heating and without sparkover.

It is still another object of the invention to provide an improved electrostatic precipitator having a housing and collector plates or surfaces composed of synthetic resin materials whereby the aforementioned disadvantages are obviated.

SUMMARY OF THE INVENTION

I have surprisingly found that it is possible to provide a plastic material which will fulfill the requirements of an electrostatic precipitator housing and electrostatic precipitator collector plates and which does not need to be provided with a liquid film but has conductivity characteristics capable of enabling it to be used for both wet and dry electrostatic precipitators without any of the aforedescribed disadvantages. The plastic material is an unsaturated polyester resin or an unsaturated vinyl ester resin containing fire retardant additives with which graphite having an average particle size up to 50 microns and a carbon content of 95 to 99 percent is admixed in such proportion that the surface resistance of the collecting electrode is equal to or less than $10^4 \Omega$ ( $\leq 10^4 \Omega$ ) while the surface resistance of the housing is equal to or less than $10^6 \Omega$ ( $\leq 10^6 \Omega$ ).

It is part of my discovery that the decrease in the surface resistance to below $10^4 \Omega$ is entirely sufficient to enable the operation of an electrostatic precipitator under dry conditions even if the latter consists of plastic material. The charges which tends to accummulate on the collector or housing surface are discharge so quickly (i.e., with a relatively short time constant) that no difficulties whatever arise on the surface on the material reinforced with glass fibers. Indeed, the collecting electrodes have a behavior similar to that of metallic collecting electrodes. On the other hand, they have the advantage that they are significantly less sucptible to corrosion and to attack by corrosive or aggressive gases than a metallic electrode.

It has been found that a higher surface resistance of the housing is tolerable and even advantageous because only static charge must be discharged. The housing wall is not under the influence of a corona discharge from which electric current must continuously be withdrawn although the generally high static charge permits some accumulation of charge which must be drained.

By providing the housing with a higher surface resistance, a reliable shock protection is ensured.

The plastic housing, rendered electrically conducted by the admixture of graphite with the synthetic resin material as described, acts like a Faraday cage to prevent radio and television interference.

BRIEF DESCRIPTION OF THE DRAWING

The above and other objects, features and advantages of the present invention will become more readily apparent from the following description, reference being made to the accompanying drawing in which the sole FIGURE is a diagram of a electrostatic precipitator, partly broken away illustrating the parts composed of synthetic resin material according to the invention.

SPECIFIC DESCRIPTION

In the drawing, I show an electrostatic precipitator having a housing 10 composed of synthetic resin walls with a surface resisitivity less than or equal to $10^6 \Omega$. The synthetic resin material is described in greater detail below. The housing walls are grounded as represented at 13 and one terminal of the high voltage electrostatic source 14 is likewise grounded as or the collector plates 16, also composed of synthetic resin material containing graphite to provide a surface resistivity less than or equal to $10^4 \Omega$. The housing ten has an inlet 11 and an outlet 12 for, respectively, the particle-laden and particle-free gas streams, the collector plates 16 defining passages for the gas which are span by corona electrodes 15 as also described in greater detail below. The particles collected on the plates are jolted therefrom and received in a bin or the like in accordance with conventional techniques.

Preferably 10 to 20% by weight graphite is admixed with the unsaturated polyester or unsaturated vinyl ester resin, and results in improvement of the wettability of the plastic material so that the system may be used in wet electrostatic precipitators as well. The polyvinyl chloride usually employed in electrostatic precipitators normally has a water repellant surface and it is indeed surprising that the admixture of graphite increases the wettability and thus the uniformity of liquid films which may be formed upon the electrostatic precipitator walls. Because of the high conductivity of the dry areas, moreover, the presence of such dry areas on a collector electrode is not disturbing or do glow discharges or sparkovers occur preferentially at these regions.

I have also noted that there is no longer a destruction of the material by sparkover during the operation of the electrostatic precipitator under dry conditions because the admixture of graphite has resulted in such an increase of the thermal conductivity of the material that any locally developed heat is rapidly dissipated.

The materials which should be used for the electrostatic precipitator are unsaturated polyester resins capable of withstanding temperatures up to 110°C and unsaturated vinyl ester resins for use of temperatures up to and above 160°C, the resin containing glass fiber and a suitable admixture of graphite as described. Before the glass fiber reinforcement is impregnated and the surface layer of synthetic resin is applied, graphite having a carbon content of 95 to 99 percent and an average particle size up to 50 microns is admixed with the polyester or vinyl ester synthetic resin in amounts of 8 to 12 percent or 15 to 20 percent depending on the intended use (i.e., depending upon whether the shaped body is to be a housing member or a collector plate).

Graphite has been found to be particularly suitable because it can be mixed well with the plastic material and does not segregate like metal powder of high density. By conventional winding or molding processes, the fiber glass reinforced graphite containing synthetic resin may be fabricated into tubes, plates, honeycombs or the like. Structural parts such as holders, supports and the like may be made from the same material and may be used for internal parts of the precipitator. The corona discharge electrodes 15 are made from corrosion-resistant materials such as titanium, tantalum, lead.

I claim:

1. In an electrostatic precipitator comprising a housing, at least one collecting electrode and at least one corona discharge electrode, the improvement wherein said housing is composed of a glass-fiber-reinforced unsaturated polyester resin or unsaturated vinyl ester resin containing graphite having an average particle size up to 50 microns and a carbon content of 95 to 99 percent in such proportion that the surface resistance of the housing is $\leq 10^6\Omega$, said collecting electrode being composed of a glass-fiber-reinforced unsaturated polyester resin or unsaturated vinyl ester resin containing graphite having an average particle size up to 50 microns and a carbon content of 95 to 99 percent in such proportion that the surface resistance of the collecting electrode is $\leq 10^4\Omega$.

2. The improvement defined in claim 1 wherein the polyester resin or vinyl ester resin of the collecting electrode contains graphite in a proportion of 15 to 20 percent.

3. The electrostatic precipitator defined in claim 1 wherein the polyester resin or vinyl ester resin of said housing contains graphite in a proportion of 8 to 12 percent.

* * * * *